US012623241B2

(12) United States Patent
Steiger et al.

(10) Patent No.: US 12,623,241 B2
(45) Date of Patent: May 12, 2026

(54) BASE BODY FOR A COATING CELL OF A COATING SYSTEM, COATING CELL HAVING SUCH A BASE BODY AND COATING SYSTEM HAVING AT LEAST ONE COATING CELL

(71) Applicant: GEMA SWITZERLAND GMBH, St. Gallen (CH)

(72) Inventors: Peter Steiger, Gossau (CH); Georg Steger, St. Gallen (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 352 days.

(21) Appl. No.: 17/998,652

(22) PCT Filed: May 19, 2021

(86) PCT No.: PCT/EP2021/063263
§ 371 (c)(1),
(2) Date: Nov. 11, 2022

(87) PCT Pub. No.: WO2021/233984
PCT Pub. Date: Nov. 25, 2021

(65) Prior Publication Data
US 2023/0347370 A1 Nov. 2, 2023

(30) Foreign Application Priority Data
May 20, 2020 (DE) ........................ 102020113645.5

(51) Int. Cl.
*B05B 13/04* (2006.01)
*B05B 14/40* (2018.01)
(Continued)

(52) U.S. Cl.
CPC .......... *B05B 13/0431* (2013.01); *B05B 14/41* (2018.02); *B05B 14/43* (2018.02);
(Continued)

(58) Field of Classification Search
USPC .......................................... 118/309, 326, 634
See application file for complete search history.

(56) References Cited

U.S. PATENT DOCUMENTS 3,905,785 A 9/1975 Fabre
3,960,323 A * 6/1976 Ducan .................... B05B 14/48
96/57
(Continued)

FOREIGN PATENT DOCUMENTS

CN 101318171 A 12/2008
CN 110239477 A 9/2019
(Continued)

OTHER PUBLICATIONS

English Translation DE102007063162B3 (Year: 2009).*
(Continued)

*Primary Examiner* — Yewebdar T Tadesse
(74) *Attorney, Agent, or Firm* — Kinney & Lange, P.A.

(57) ABSTRACT

A main part for a coating cell of a coating plant has a modular design and is an exchangeable element within the entire system of the coating plant. The main part is further designed to be connectible to at least one sidewall in the form of a module, to provide a particularly user-specifically configured coating cell.

13 Claims, 3 Drawing Sheets

(51) Int. Cl.

| | |
|---|---|
| ***B05B 14/41*** | (2018.01) |
| ***B05B 14/43*** | (2018.01) |
| ***B05B 14/45*** | (2018.01) |
| ***B05B 14/48*** | (2018.01) |
| ***B05B 16/40*** | (2018.01) |

(52) U.S. Cl.

CPC .............. *B05B 14/45* (2018.02); *B05B 14/48* (2018.02); *B05B 16/40* (2018.02)

(56) References Cited

U.S. PATENT DOCUMENTS

| | | | | | |
|---|---|---|---|---|---|
| 4,409,009 | A | * | 10/1983 | Lissy | B01D 46/2407 118/DIG. 7 |
| 4,417,541 | A | | 11/1983 | Schaefer | |
| 5,288,324 | A | | 2/1994 | Shaneyfelt | |
| 5,512,100 | A | | 4/1996 | Ingram et al. | |
| 5,769,703 | A | * | 6/1998 | Conlin | B05B 16/40 118/634 |
| 6,508,610 | B2 | | 1/2003 | Dietrich | |
| 2005/0011438 | A1 | | 1/2005 | Ainsworth et al. | |
| 2006/0193704 | A1 | | 8/2006 | Simontacchi | |

FOREIGN PATENT DOCUMENTS

| | | | | | |
|---|---|---|---|---|---|
| DE | 2945436 | A1 | | 12/1980 | |
| DE | 8907540 | U1 | | 10/1990 | |
| DE | 4019555 | A1 | | 12/1990 | |
| DE | 10145448 | A1 | | 5/2003 | |
| DE | 10353968 | A1 | | 7/2005 | |
| DE | 102007063162 | B3 | * | 3/2009 | B05B 15/1203 |
| DE | 102011108631 | A1 | * | 1/2013 | B05B 14/43 |
| DE | 102012213500 | A1 | | 2/2014 | |
| EP | 0384236 | A1 | | 8/1990 | |
| EP | 0678336 | A2 | | 10/1995 | |
| EP | 1935504 | A2 | | 6/2008 | |
| EP | 3459642 | A1 | | 3/2019 | |
| JP | H10272389 | A1 | * | 10/1998 | |
| JP | 2013255916 | A | | 12/2013 | |
| SE | 528772 | C2 | | 2/2007 | |
| WO | 2005051549 | A1 | | 6/2005 | |
| WO | WO-2013119487 | A1 | * | 8/2013 | B05B 14/10 |

OTHER PUBLICATIONS

English Translation DE102011108631A1 (Year: 2013).*

English Translation JP-H10272389A (Year: 1998).*

International Preliminary Report on Patentability dated Dec. 1, 2022, for corresponding PCT Application No. PCT/EP2021/063263.

German Office Action dated Dec. 18, 2020, for corresponding German Application No. 10 2020 113 645.5.

English Translation of International Search Report dated Aug. 17, 2021, for corresponding PCT Application No. PCT /EP2021/063263.

German Office Action dated Jun. 23, 2023, for corresponding German Application No. 10 2020 113 645.5.

Third Chinese Office Action dated Nov. 4, 2025, for corresponding Chinese Patent Application No. 202180036287.1, 29 pgs.

Chinese Office Action dated Jun. 14, 2025, for corresponding Chinese Patent Application No. 202180036287.1, 15 pgs.

Communication Pursuant to Art. 94(3) EPC dated Aug. 1, 2024, for corresponding European Patent Application No. 21728491.8-1005, 4 pgs.

* cited by examiner

BASE BODY FOR A COATING CELL OF A COATING SYSTEM, COATING CELL HAVING SUCH A BASE BODY AND COATING SYSTEM HAVING AT LEAST ONE COATING CELL

CROSS-REFERENCE TO RELATED APPLICATION(S)

This application is the national phase of PCT Application No. PCT/EP2021/063263 filed on May 19, 2021, which claims priority to German Application No. 102020113645.5 filed on May 20, 2020, the contents of which are incorporated herein by reference in their entirety.

BACKGROUND

The present disclosure relates in general to the surface treatment of workpieces and in particular to the coating of workpieces with coating material, in particular coating powder.

According to one aspect of the present disclosure, same relates to a coating booth or respectively coating cell of a coating system optimized for coating workpieces.

Coating booths or coating cells for coating workpieces, in particular with coating powder, are known in general from the prior art. Such coating booths or coating cells usually comprise a coating chamber having a booth floor, two oppositely positioned workpiece passageways as well as a conveyor device for transporting workpieces to be coated through the coating chamber.

For example, printed publication EP 0 071 756 A2 relates to a coating booth having a conveyor device which transports the objects to be coated through the booth's interior via an entrance and an exit. A spraying device of the booth is thereby a manual spray gun behind openable doors in a wall panel. However, automatically controlled spray guns can also be provided. The doors also allow access to the interior of the booth. The spraying devices with the spray guns can all be arranged on the same side of the booth. Spraying devices in the form of wall panels prepared with slots for guns to pass through can also be provided on the opposite side.

Instead of a conveyor device for automatically transporting the objects to be coated through the booth's interior, the objects to be coated can also be manually introduced into the booth's interior and—subsequent a coating procedure—removed again.

The conveyor device for automatically transporting the objects to be coated through the booth's interior can also be arranged beneath the booth floor of the coating booth and has a workpiece carrier which extends into the coating chamber of the coating booth through a conveyance slot in the booth floor.

Coating booths having such "floor conveyors" are particularly used in the coating of high-quality workpieces since high coating quality can be achieved by arranging the conveyor device beneath the booth floor. This is particularly due to the fact that "traditional" conveyors for the suspended transport of workpieces through the coating chamber can facilitate the falling of dirt particles or powder residues from the conveyor device, which can lead to irregularities in the coating.

On the other hand, particularly with respect to powder coating, booths or systems for the intermittent transport of workpieces in manual coating procedures are also known, whereby this type of booth differs from flow-type booths designed for the continuous transport of workpieces in manual and/or automatic coating processes. Which of these basic types is used essentially depends on the scope of the respective coating task, thus the task to be performed by the coater, wherein a distinction can essentially be made here between the following categories:

- large batches in only one or a few shades (e.g. coating area of 1000 $m^2$ and larger);
- medium batches in multiple shades (e.g. coating area of 200 to 1000 $m^2$);
- application of many different colors in small batches (e.g. coating area in the 100 $m^2$ range);
- single-item production, coating of small batches, for example producing samples in a wide variety of shades; and
- performing cleaning activities on individual parts/workpieces and equipment.

This categorization already shows how different the requirements are for the respective system/booth used and that finding the most favorable balance between work/setup time, material costs and environmental impact is what matters in each respective case.

It is easy to see that the focus is on very different key requirements when satisfying the five above-cited functional categories. Thus, with large batches, efforts are made to automate the work as much as possible; automatic coating systems are usually employed to that end. With medium-sized batches, because of the rapid changes in color required, the main focus is on reducing the set-up times and particularly the cleaning times.

SUMMARY

The present disclosure is based on the task of specifying a booth concept which allows the coating booth or coating system respectively to be used as flexibly and automatically as possible and yet still deliver optimum productivity and economy.

In particular, the booth concept should be suited to factoring in the particularities arising in the course of ongoing automation of the coating process, particularly the fact that coating robots are increasingly being used for automatic coating processes. Moreover, the booth concept should be suited to being able to react as flexibly as possible to different requirements.

Accordingly, the present disclosure in particular relates to a coating concept of modular design which allows a particularly simple application-specific configuration of a coating booth or coating cell so as to be able to optimally take into account all the particularities of the individual case.

The present disclosure in particular relates to a base body for a coating cell of a coating system, wherein the base body has a modular structure and is preferably designed as an interchangeable element within the overall coating system. The base body is in particular designed to be connectable to at least one preferably modularly designed side wall so as to be able to provide a particularly application-specific configured coating cell.

According to embodiments, the base body is designed to be connected to a further base body, preferably of the same kind or type, so as to form at least one section of a coating line of a coating system.

Particularly preferentially, the base body forms the lower part and the cell floor of the coating cell and in particular exhibits a polygonal and preferably rectangular surface area. The base body in particular has at least one tub-shaped, trough-shaped or recessed interior area forming the cell floor of the coating cell which has at least one surface inclined or curved in the direction of a vent or in the direction of an extraction duct.

In this context, it is conceivable for the base body to further exhibit a frame-shaped exterior area which at least partially accommodates the at least one tub-shaped, trough-shaped or recessed interior area.

According to one aspect of the present disclosure, the base body comprises an integrated extraction system for suctioning or drawing off overspray powder during the coating operation of the coating cell, particularly as needed.

The term "overspray powder" as used herein is to be understood as coating material which was unable to be applied to the workpiece to be coated or which has already been sprayed at least once during a coating procedure and is suitably recycled. Such overspray powder is sometimes also referred to as "recovery" material.

In this context, embodiments of the present disclosure provide for the extraction system to comprise at least one vent formed in the frame-shaped exterior area and preferably arranged centrally in a side wall of the exterior area and fluidically connected to a vacuum source. This at least one vent is fluidically connected to at least one vent which opens into the interior area and/or to at least one extraction duct formed at least in part in the interior area by means of a system of ducts formed between the exterior area and the interior area. According to further developments thereof, the base body has two adjacently arranged tub-shaped, trough-shaped or recessed interior areas, these being mirror images of each other and accommodated in a common frame-shaped exterior area.

It is thereby conceivable for the extraction system to comprise at least one vent formed in the frame-shaped exterior area and preferably arranged centrally in a side wall of the exterior area and fluidically connectable to a vacuum source, wherein the vent is fluidically connected to a vent which opens into a first interior area of the two interior areas as well as to a vent which opens into a second interior area of the two interior areas by means of a system of ducts formed between the exterior area and the two interior areas.

Particularly in the case of coating systems having multiple coating cells, it is conceivable for the at least one vent formed in the frame-shaped exterior area to be fluidically connectable to an extraction system of a further base body of a coating cell and preferably to an extraction system of a further base body of the same kind or type.

The base body preferably comprises an integrated blow-off system for the in particular need-based and preferably pulsed release of compressed air particularly along the at least one inclined or curved surface of the booth floor and toward the vent or extraction duct. Advantageous in this context is for the blow-off system to comprise at least one blow-off rail and preferably a plurality of blow-off rails which can be individually controlled as necessary and pressurized with compressed air, whereby the blow-off rails have corresponding blow-off vents which preferably open into the interior area within an edge area of said interior area.

With respect to the coating booth, it is advantageously provided for at least sections of the booth floor surrounding the conveyance slot to be of ramped design, whereby at least one air blowing device is provided for the preferably pulsed blowing of a flow of air along the ramped section of the booth floor off toward at least one extraction duct provided in the booth floor. Advantageously, the at least one air blowing device is provided at the conveyance slot.

Preferably, use is made of at least one further air blowing device on or in at least one side wall of the coating booth adjoining the side walls with the workpiece passageways. The further air blowing device is in particular designed for the preferably pulsed blowing of a flow of air along the booth floor off toward the at least one extraction duct provided in the booth floor.

The present disclosure further relates to a coating cell of a coating system, whereby the coating cell has a base body of the above-described type and at least one side wall preferably designed as a module with the base body, and preferably also a roof section connected or connectable to the at least one side wall. The coating cell according to the present disclosure is particularly suited to the automated powder coating of workpieces. The coating cell preferably has a surface area adapted to the operating range of a coating robot.

The coating cell preferably exhibits two passageways for leading the workpiece in and out as well as a single side wall opposite from the open side of the coating cell where the coating robot is provided.

The base body forms the coating cell's basic component, which makes it possible to construct flexible coating cells for different applications. The base body serving as the lower part is modular and standardized.

The modular structure of the base body enables customizing the coating cell and in particular connecting the at least one side wall to the base body such that a coating robot has optimal access, for example from a first, second or third side or from a corner of the base body. This flexible coating cell is primarily used in conjunction with coating robots but could however also be used in series with a conventional automatic system (axis and manual coating stations).

The surface area of the base body is preferably 1 to 3 m (width and length) and typically 1.5 to 2.5 m. In the case of a double cell, the length increases, whereby however the width remains in the same order of magnitude.

BRIEF DESCRIPTION OF THE DRAWINGS

The following will reference the accompanying drawings in describing the disclosure in greater detail.

Shown are.

DETAILED DESCRIPTION

Figure 1:
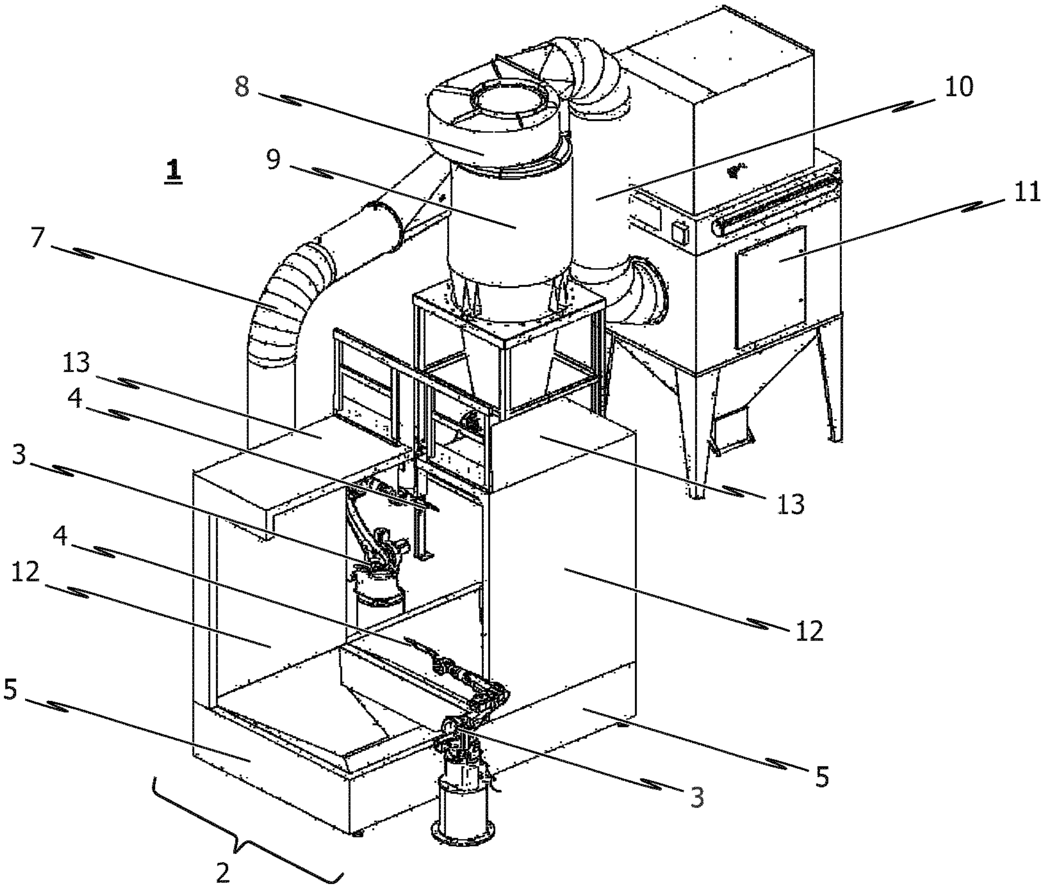
FIG. 1 a schematic and isometric view of part of a coating system with coating cells according to embodiments of the present disclosure.

FIG. 1 shows a schematic and isometric view of an exemplary embodiment of a powder coating system 1 according to the disclosed solution. The powder coating system 1 serves in the spray coating of objects with coating powder, which is then fused onto the objects in a heating furnace (not depicted in FIG. 1). One or more electronic control devices are provided for controlling the operation of the powder coating system 1.

Powder pumps are provided for the pneumatic conveyance of the coating powder. These may be injectors in which coating powder resources are sucked out of a powder container by compressed air serving as conveying air, after which the mixture of conveying air and coating powder then flows together into a container or to a spraying device. Suitable injectors are for example known from printed publication EP 0 412 289 B1.

Powder pumps used as the powder pump can also be of such type which consecutively pump small portions of powder via compressed air, whereby each small portion of powder (powder quantity) is stored in a powder chamber and then expelled from the powder chamber by means of compressed air. The compressed air stays behind the portion of powder and pushes it forward. These types of pumps are sometimes referred to as "compressed air thrust pumps" or "plug conveyance pumps" because the compressed air thrusts the stored portion of powder forward ahead of itself through a pump discharge line like a plug. Various types of such powder pumps for conveying dense coating powder are known for example from the following printed publications: DE 103 53 968 A1, U.S. Pat. No. 6,508,610 B2, US 2006/0193704 A1, DE 101 45 448 A1 or WO 2005/051549 A1.

The invention is not limited to any one of the cited types of powder pumps.

In the coating system according to FIG. 1, each coating cell 2 also makes use of an applicator system 3 for spraying coating material as needed in the respective coating cell 2. The applicator system 3 comprises at least one corresponding gun system 4 for spraying coating material as required.

The coating system 1 in particular provides for the at least one gun system 4 to be assigned a robot system for positioning and/or aligning the gun system relative to the workpieces to be coated during a coating procedure.

The robot system together with the at least one gun system 4 constitutes a coating robot 3 which—in contrast to conventional axis or positioning systems—is not realized as a system which travels along through the coating cell 2 with the workpieces to be coated as the workpieces to be coated are being transported. Each coating robot 3 is movable in three dimensions relative to the base body 5 of the coating cell 2 and relative to a workpiece.

Preferential implementations of the coating system 1 in particular provide for the at least one gun system 4 to be assigned a robotic arm system able to be moved in all directions beneath or above a conveyor device for the workpieces to be coated with the aid of robotic guidance.

The gun system 4 preferentially comprises at least one coating gun. The coating gun is preferably an electrostatic coating gun designed to electrostatically charge the coating material to be sprayed with the coating gun.

Preferential implementations of the coating system 1 provide for the coating gun(s) to be assigned a control device for the controlling and/or regulating of the currents in the coating material charging process. The control device is in particular designed to regulate current values below 10 μA in at least 0.5 μA increments.

As particularly shown in FIGS. 2 to 5, advantageously provided with respect to the coating cell 2 is for at least sections of the booth floor to be of ramped design, whereby at least one air blowing device is provided for the preferably pulsed blowing of a flow of air along the ramped section of the booth floor off toward at least one extraction duct 6 provided in the booth floor.

Preferably, use is made of at least one further air blowing device on or in at least one side wall of the coating cell 2 adjoining the side walls with the workpiece passageways. The further air blowing device is in particular designed for the preferably pulsed blowing of a flow of air along the booth floor off toward the at least one extraction duct 6 provided in the booth floor.

The coating system 1 comprises a coating material supply (not shown in FIG. 1) for supplying coating material to the gun systems 4 of the coating robots 3. The coating material supply is thereby in particular designed to only supply fresh coating material or fresh coating material along with recovery material or only recovery material to the respective gun systems 4 as needed.

The term "recovery material" as used herein is to be understood as coating material which has already been sprayed at least once during a coating procedure and suitably recycled. Such recovery material is sometimes also referred to as "overspray material."

Further developments of the coating system provide for the coating material supply to preferably have at least one coating material pump for each gun system 4, wherein the coating material pump is preferably based on the dense flow principle and designed for continuous coating material conveyance.

Coating powder which does not adhere to the object to be coated is suctioned into a cyclone separator 9 through an excess powder line 7 as overspray powder (excess powder) by a flow of suction air from a blower 8. The cyclone separator 9 separates as much excess powder from the suction air flow as possible. The separated portion of powder is then routed as reclaimed or respectively recovery powder through a reclaimed powder line from the cyclone separator 9 to an optionally provided sieving device where it passes through the sieving device either alone or mixed with fresh powder via powder feed lines back to the spray guns 4 of the robotic systems.

The exhaust air of the cyclone separator 9 reaches an after-filter device 11 via an exhaust air line 10 and passes through one or more filter elements therein to the blower 8 and thereafter into the outside atmosphere. The filter elements can be filter bags, filter cartridges, filter plates or similar filter elements. The powder separated from the airflow by the filter elements is normally waste powder and falls into a waste container via gravity or can be conveyed to a waste container at a waste station via one or more waste lines.

FIG. 1 shows in particular a section of a coating system 1 comprising two coating cells 2, each fitted with an exemplary embodiment of the base body 5 according to the present disclosure.

The coating system 1 shown schematically and in an isometric view in FIG. 1 specifically comprises a first coating cell 2 as well as a second coating cell 2 arranged directly adjacent thereto. Each of the two coating cells 2 is characterized by being designed for automatic powder coating using a coating robot 3.

In contrast to coating cells 2 as used to date for automatic powder coating, the coating cells 2 used in the coating system 1 depicted schematically in FIG. 1 are designed in particular with a view to powder coating by means of a coating robot 3. To that end, each coating cell 2 only has one (single) side wall 12 with a roof section 13 which preferably only partially covers the top of the coating cell 2 so as to be able to make optimal use of the maneuverability of the coating robot 3.

The side of the coating cell 2 opposite from the single side wall 12 is designed as an "open" side wall so that the coating robot 3 can coat the full entirety of a workpiece to be coated (not shown in FIG. 1) as needed.

The respective base bodies 5 of the coating cells 2 used in the coating system 1 each have a modular structure and are in particular preferably of identical configuration to one another. Each base body 5 can be designed as an interchangeable element within the overall system of the coating system 1. The respective side walls 12 connected to the base bodies 5 are preferably likewise of similar design and connectable to the base bodies 5 of the coating cells 2 as a module.

The two base bodies 5 of the coating cells 2 are connected together and respectively form the bottom section and the cell floor of the corresponding coating cell 2. A polygonal and in particular rectangular cell floor surface area is thereby particularly preferential.

Each base body 5 of the coating cells 2 is assigned an integrated extraction system for suctioning and drawing off any overspray powder that may accumulate during the coating operation of the coating cell 2.

FIGS. 2 to 5 show different configurations of the base body 5, each in an isometric and schematic view. Each embodiment of the base body 5 exhibits a modular structure and is designed to be connectable to at least one side wall 12 preferably likewise designed as a module so as to provide an in particular application-specific configured coating cell 2.

As depicted in FIGS. 2 to 5, the base bodies 5 form the bottom section and cell floor of the coating cell 2 and each exhibit a polygonal and in particular rectangular surface area.

Each base body 5 comprises at least one tub-shaped, trough-shaped or recessed interior area 14 forming the cell floor of the coating cell 2 which has at least one surface 16 inclined or curved in the direction of a vent 15, 19 or in the direction of an extraction duct 6.

It is thereby provided for the base body 5 to exhibit a frame-shaped exterior area 17 which at least partially accommodates the at least one tub-shaped, trough-shaped or recessed interior area 14.

As already stated in connection with the exemplary embodiment of the coating system 1 as shown schematically in FIG. 1, each base body 5 comprises an integrated extraction system in order to in particular suction or respectively draw off overspray powder during the powder coating operation of the coating cell 2 as needed. In particular provided in this context is for the extraction system to comprise at least one vent 19 formed in the frame-shaped exterior area 17 and preferably arranged centrally in a side wall 18 of the exterior area 17 and fluidically connected to a vacuum source.

This at least one vent 19 is fluidically connected to at least one vent 19 which opens into the interior area 14 and/or to at least one extraction duct 6 formed at least in part in the interior area 14 by means of a system of ducts formed between the exterior area 17 and the interior area 14.

Figure 5:
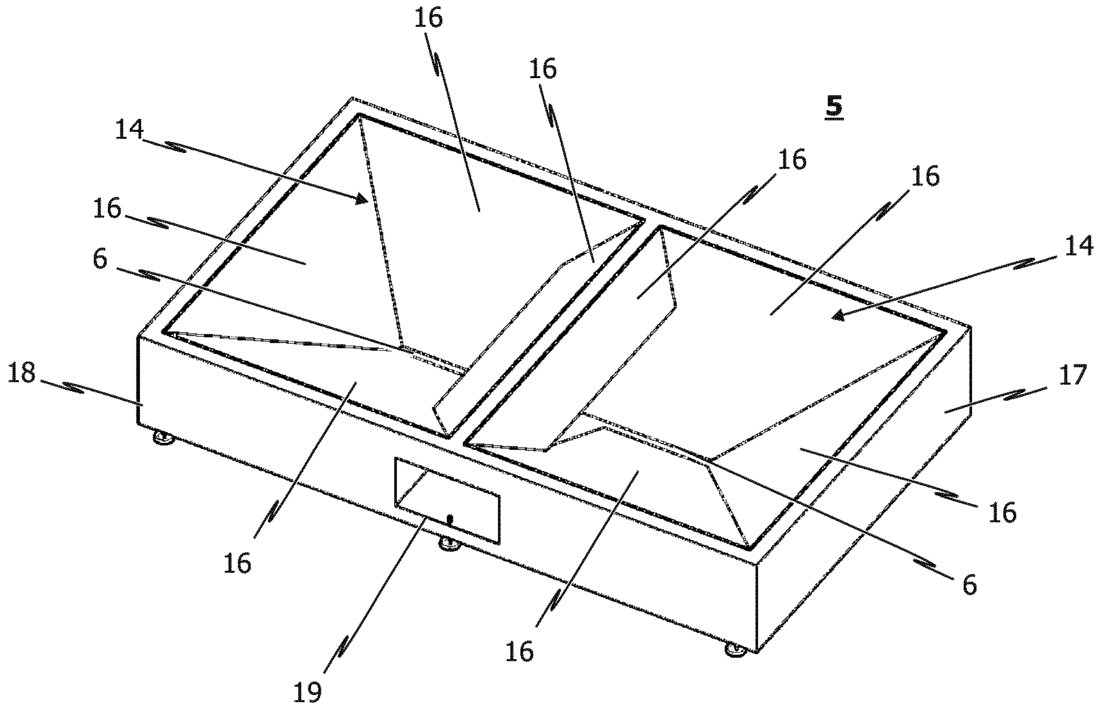
FIG. 5 a schematic and isometric view of a fourth exemplary embodiment of the base body of a coating cell.

As can particularly be seen from the schematic representation in FIG. 5, embodiments of the present disclosure can provide for the base body 5 to comprise two (or more) tub-shaped, trough-shaped or recessed interior areas 14 which are adjacently arranged and in particular mirror images of each other, these being accommodated in a common frame-shaped exterior area 17.

In the embodiment of the base body 5 depicted schematically in FIG. 5, the extraction system comprises at least one vent 19 formed in the frame-shaped exterior area 17 and preferably arranged centrally in a side wall of the exterior area 17 and fluidically connected to a vacuum source, whereby this vent 19 is fluidically connected to a vent 19 which opens into a first interior area 14 of the two interior areas 14 as well as to a vent 19 which opens into a second interior area 14 of the two interior areas 14 by means of a system of ducts formed between the exterior area 17 and the two interior areas.

In principle, it is advantageous for the at least one vent 19 formed in the frame-shaped exterior area 17 to be fluidically connectable to an extraction system of a further base body 5 of preferably the same kind or type. In other words, a series connection of the base bodies 5 is possible in terms of the as-needed suctioning of overspray powder.

The exemplary embodiments of the base body 5 preferably further comprise an integrated blow-off system in order to be able to release in particular need-based and preferably pulsed compressed air, and to do so particularly along the at least one inclined or curved surface 16 and toward the vent 19 or extraction duct of the base body 5.

Figure 2:
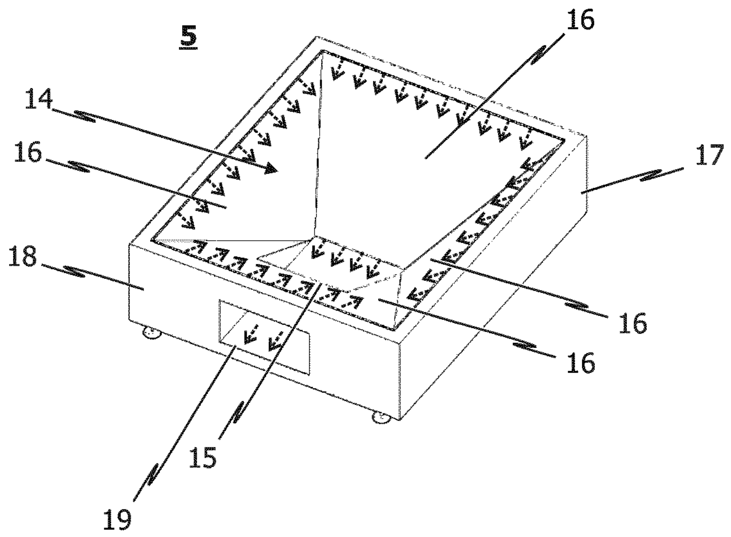
FIG. 2 a schematic and isometric view of a first exemplary embodiment of the base body of a coating cell.
Figure 3:
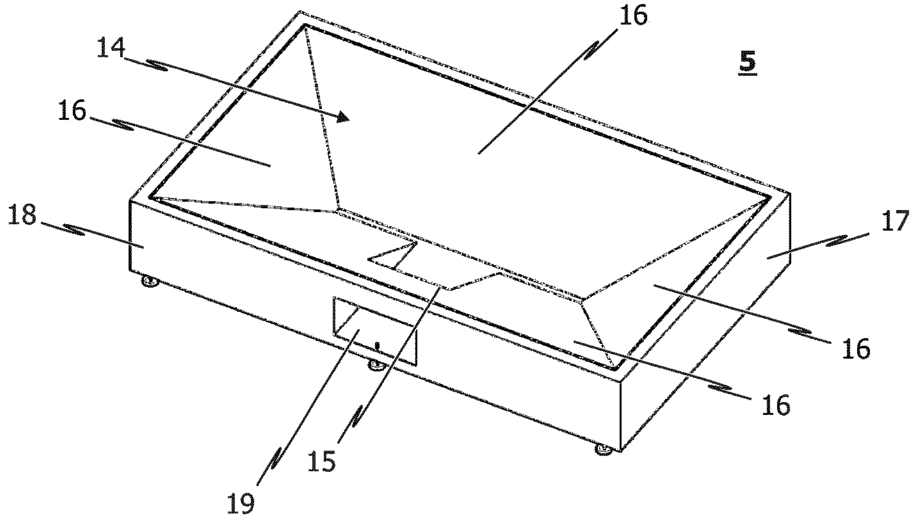
FIG. 3 a schematic and isometric view of a second exemplary embodiment of the base body of a coating cell.
Figure 4:
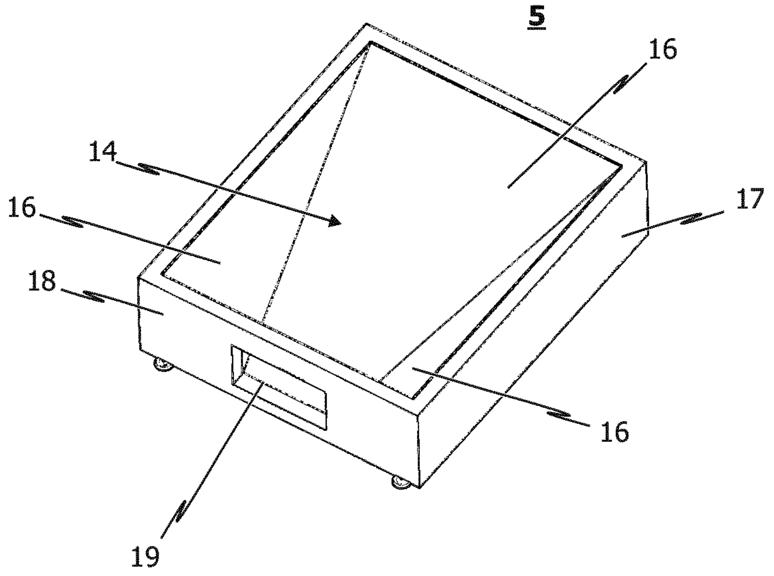
FIG. 4 a schematic and isometric view of a third exemplary embodiment of the base body of a coating cell.

Advantageous in this context is for the blow-off system to comprise at least one blow-off rail and preferably a plurality of blow-off rails, wherein the at least one blow-off rail has at least one blow-off vent which opens into the interior area 14 within an edge area of said interior area. FIG. 2 indicates in this regard how the blow-out, preferably the pulsed blowing out of compressed air, can occur in the cleaning operation.

The invention is not limited to the embodiments depicted in the drawings but rather yields from an integrated overall consideration of all the features as disclosed herein.

The invention claimed is:

1. A coating cell of a coating system, comprising:
- a base body having a modular structure;
- a side wall with a roof section; and
- an open side opposite the side wall, the open side having no wall so as to facilitate access into the coating cell by coating robot,
- wherein the side wall is a single uninterrupted wall fully defining a perimeter of the coating cell together with the open side, and
- wherein the base body comprises an integrated extraction system for suctioning or drawing off overspray powder during a coating operation of the coating cell.

2. The coating cell according to claim 1,
- wherein the base body is configured to be connected to a further base body of the same kind or type, so as to form at least one section of a coating line of the coating system.

3. The coating cell according to claim 1,
- wherein the base body forms a lower part and a cell floor of the coating cell and exhibits a polygonal surface area.

4. The coating cell according to claim 3,
- wherein the base body has at least one tub-shaped, trough-shaped or recessed interior area forming the cell floor of the coating cell which has at least one surface inclined or curved in a direction of a vent or in a direction of an extraction duct.

5. The coating cell according to claim 4,
- wherein the base body exhibits a frame-shaped exterior area which at least partially accommodates the at least one tub-shaped, trough-shaped or recessed interior area.

6. The coating cell according to claim 5,
- wherein the base body comprises an integrated extraction system for suctioning or drawing off overspray powder during a coating operation of the coating cell; and
- wherein the integrated extraction system comprises at least one first vent formed in the frame-shaped exterior area and arranged centrally in a side wall of the exterior area and fluidically connected to a vacuum source, wherein the at least one first vent is fluidically connected to at least one second vent which opens into the interior area and/or to at least one extraction duct formed at least in part in the interior area by a system of ducts formed between the exterior area and the interior area.

7. The coating cell according to claim 6, wherein the at least one first vent formed in the frame-shaped exterior area is fluidically connectable to an extraction system of a further base body of the same kind or type.

8. The coating cell according to claim 4, wherein the base body has two adjacently arranged tub-shaped, trough-shaped or recessed interior areas in mirrored configuration of each other which are accommodated in a common frame-shaped exterior area.

9. The coating cell according to claim 8, wherein the base body comprises an integrated extraction system for suctioning or drawing off overspray powder during a coating operation of the coating cell; and wherein the extraction system comprises at least one first vent formed in the frame-shaped exterior area and arranged centrally in a side wall of the exterior area and fluidically connectable to a vacuum source, wherein the at least one first vent is fluidically connected to a second vent which opens into a first of the two interior areas as well as to a third vent which opens into a second of the two interior areas by a system of ducts formed between the exterior area and the two interior areas.

10. The coating cell according to claim 9, wherein the at least one first vent formed in the frame-shaped exterior area is fluidically connectable to an extraction system of a further base body of the same kind or type.

11. The coating cell according to claim 4, wherein the base body comprises an integrated blow-off system for pulsed release of compressed air along the at least one inclined or curved surface and toward the vent or the extraction duct.

12. The coating cell according to claim 11, wherein the blow-off system comprises at least one blow-off rail, wherein the at least one blow-off rail has at least one blow-off vent which opens into the interior area within an edge area of the interior area.

13. A coating system for coating and/or surface treatment of workpieces which comprises at least two coating cells according to claim 1 connected in series and to each other.

* * * * *